(12) United States Patent
Boutaghou

(10) Patent No.: US 6,636,386 B1
(45) Date of Patent: Oct. 21, 2003

(54) INTEGRAL FORMING TECHNOLOGY FOR DISC DRIVE BEARING

(75) Inventor: Zine-Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/470,032

(22) Filed: Dec. 22, 1999

Related U.S. Application Data

(60) Provisional application No. 60/138,697, filed on Jun. 11, 1999.

(51) Int. Cl.[7] .................................................. G11B 5/55
(52) U.S. Cl. ................................................... 360/265.2
(58) Field of Search .................. 360/78.05, 264.5, 360/265.2, 265.4, 265.6, 294.4, 294.6; 310/306, 309

(56) References Cited

U.S. PATENT DOCUMENTS

| | | | |
|---|---|---|---|
| 4,728,831 A | 3/1988 | Cheng | 310/13 |
| 4,900,165 A * | 2/1990 | Kun et al. | 384/220 |
| 5,327,033 A * | 7/1994 | Guckel et al. | 310/40 |
| 5,377,962 A * | 1/1995 | Ochs et al. | 267/141.3 |
| 5,491,598 A | 2/1996 | Stricklin et al. | 360/106 |
| 5,675,456 A * | 10/1997 | Myers | 360/265.6 |
| 5,761,006 A | 6/1998 | Sri-Jayantha et al. | 360/106 |
| 5,914,837 A | 6/1999 | Edwards et al. | 360/106 |
| 5,920,441 A * | 7/1999 | Cunningham et al. | 360/78.05 |
| 6,137,206 A * | 10/2000 | Hill | 310/306 |
| 6,198,145 B1 * | 3/2001 | Ferrari et al. | 257/415 |

* cited by examiner

*Primary Examiner*—David Hudspeth
*Assistant Examiner*—Angel Castro
(74) *Attorney, Agent, or Firm*—Westman, Champlin & Kelly

(57) ABSTRACT

A disc drive includes a base including an axle shaft, a disc stack rotationally mounted to the base, a head assembly coupled to the disc stack, a voice coil and a bearing. The bearing has an inner hub rotationally mounted on the axle shaft, and an outer hub that mounts the voice coil and the head assembly. The outer hub is rotationally mounted to the inner hub through a plurality of flexible spokes that are integrally formed with the inner and outer hubs. The flexible spokes allow the outer hub to rotate when the inner hub is stopped by stiction. Integral forming provides a predictable response desired for a disc drive.

18 Claims, 12 Drawing Sheets

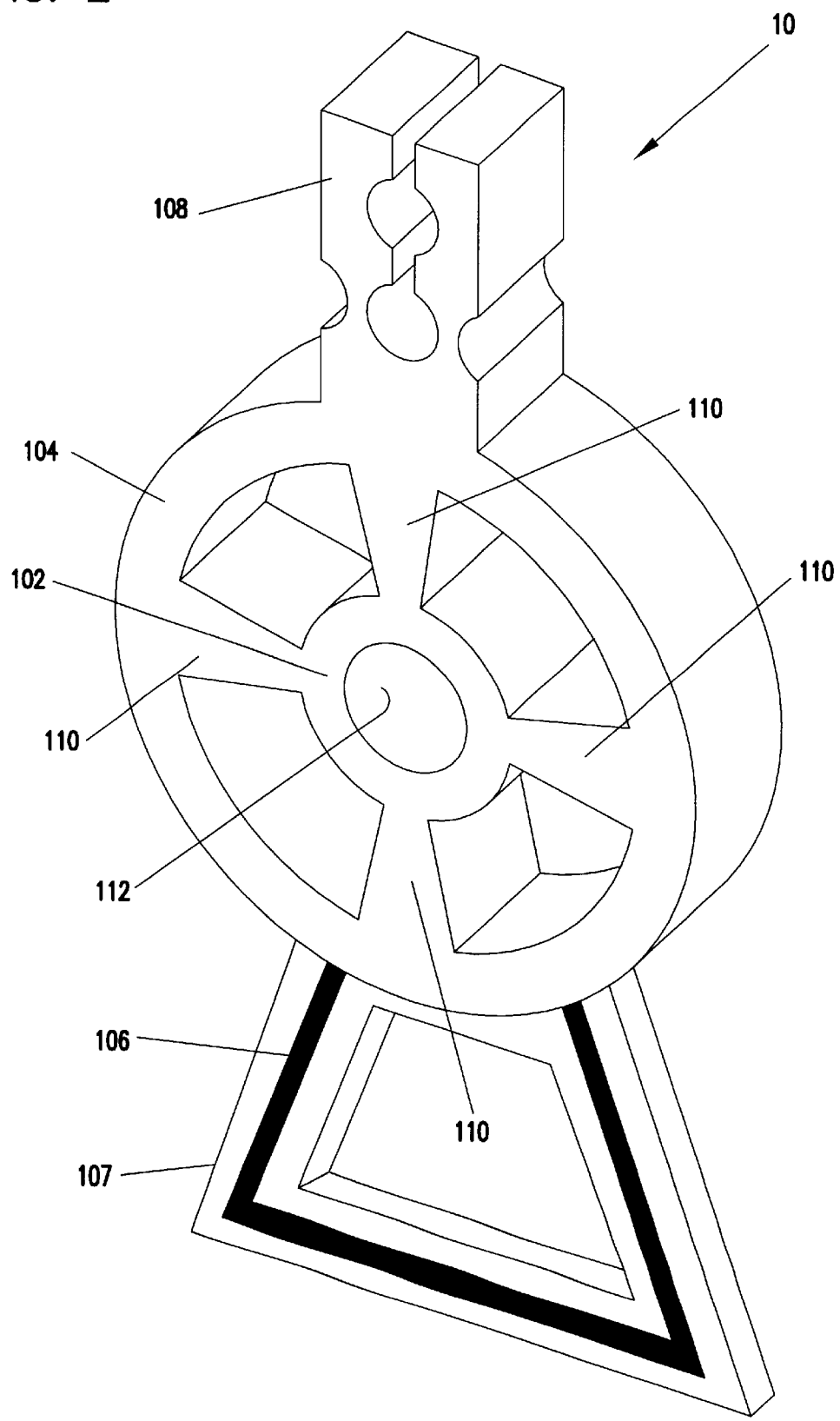

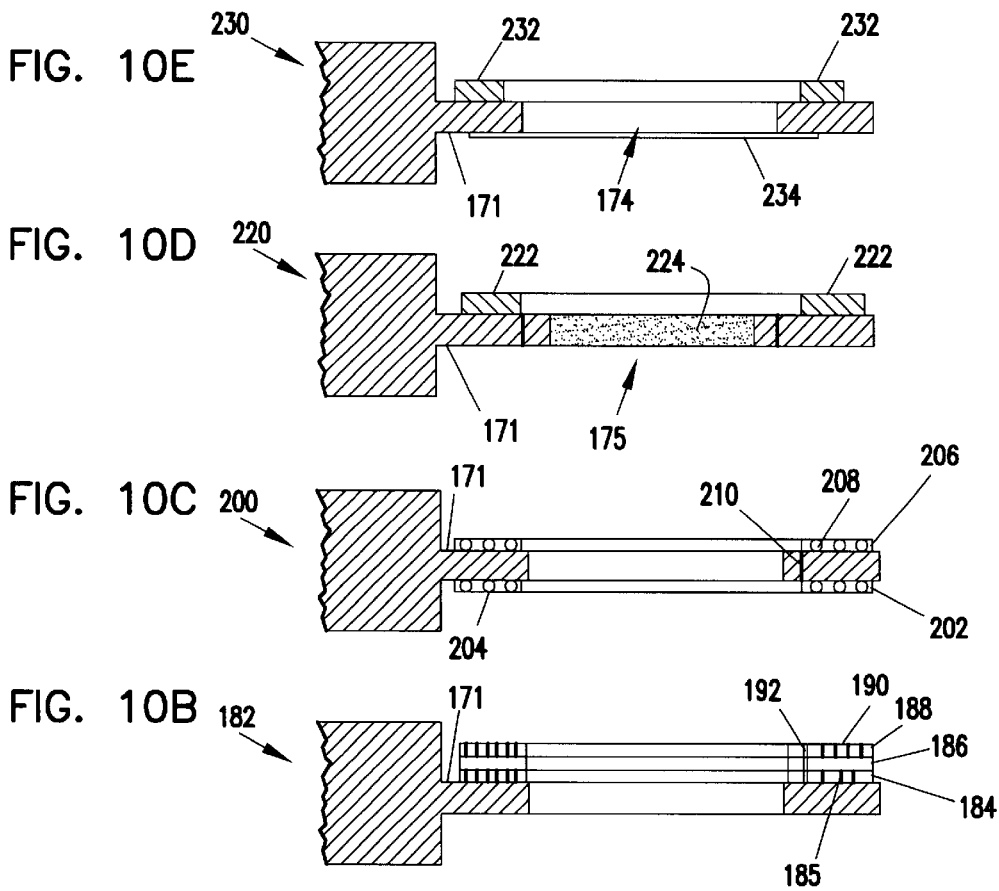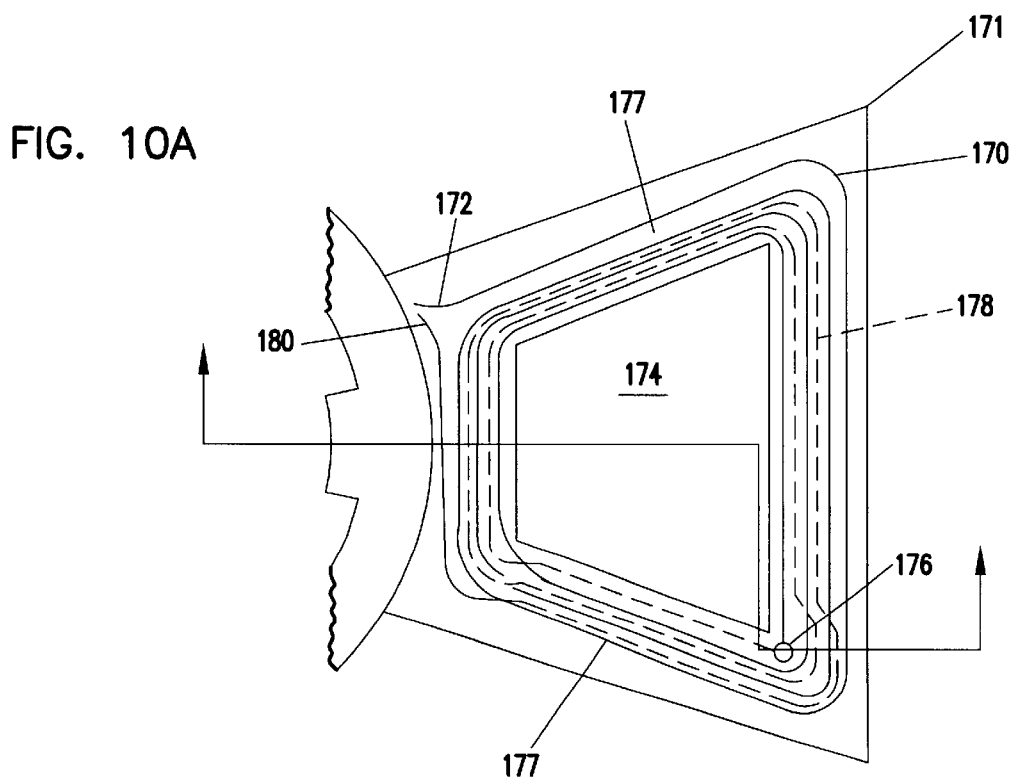

INTEGRAL FORMING TECHNOLOGY FOR DISC DRIVE BEARING

REFERENCE TO CO-PENDING APPLICATION

This application claims priority benefits from U.S. provisional patent application 60/138,697 entitled ACTUATOR ARM DESIGN FOR MILLI/MICRO DRIVE TO OVERCOME STICK/SLIP OF BALL BEARINGS filed on Jun. 11, 1999.

BACKGROUND OF THE INVENTION

Compound bearing systems for disc drives are known, for example, from U.S. Pat. No. 5,761,006 Sri-Jayantha et al. Systems are assembled from separate conventional components that are joined together to make an assembled compound bearing system. Typically, a conventional ball bearing is assembled within a flex bearing assembly and then a voice coil and a read/write head are assembled on the flex bearing. Such a compound bearing system includes a relatively large number of joints where the various bearing components are assembled with each other. Assembling and joining the components of such a bearing system by conventional methods inevitably leads to variability in the dynamic mechanical properties of the assembled bearings. Resonant mechanical frequencies and mechanical damping coefficients of the bearing system tend to have an undesired statistical spread in production and may, in some cases, require expensive hand trimming to assure uniform performance needed for mass production. Non-uniformity in thicknesses or assembly can twist the bearing system transverse to the plane of rotation, degrading performance of the disc drive.

Much smaller disc drive dimensions are becoming available in milli- and micro-disc drives, and the conventional assembled disc drive compound bearing system limits drive performance and becomes costlier and less practical to produce for use with these smaller disc drives.

A disc drive with a bearing and a method of fabricating a disc drive bearing which combine both flexible bearing and sliding bearing elements with increased uniformity is needed for mass production applications in smaller, miniaturized disc drives.

SUMMARY OF THE INVENTION

A disc drive comprises a base including an axle shaft. A disc stack is rotationally mounted to the base. A head assembly couples to the disc stack. The disc drive further includes a voice coil mounted to a bearing for positioning the head assembly. The bearing has an inner hub rotationally mounted on the axle shaft. The bearing has an outer hub having the voice coil and the head assembly mounted thereon. The outer hub is rotationally mounted to the inner hub through a plurality of flexible spokes that are integrally formed with the inner and outer hubs.

The bearing is formed by the method of etching from a substrate to provide an integrally formed inner hub, outer hub and spokes. The voice coil is deposited on the integrally formed assembly. The integral bearing is free of joints between the spokes and the inner and outer hubs. The bearings integrally formed by this method have uniform mechanical characteristics desired for miniature disc drives. The bearings can be mass produced by batch fabrication techniques.

BRIEF DESCRIPTION OF THE DRAWINGS

FIG. 2 is a perspective view of an embodiment of a bearing usable for supporting the read/write head assembly and voice coil in a magnetic disc drive.

FIGS. 10A–10E are illustrations of embodiments of voice coils.

DETAILED DESCRIPTION OF THE PREFERRED EMBODIMENTS

Figure 1:
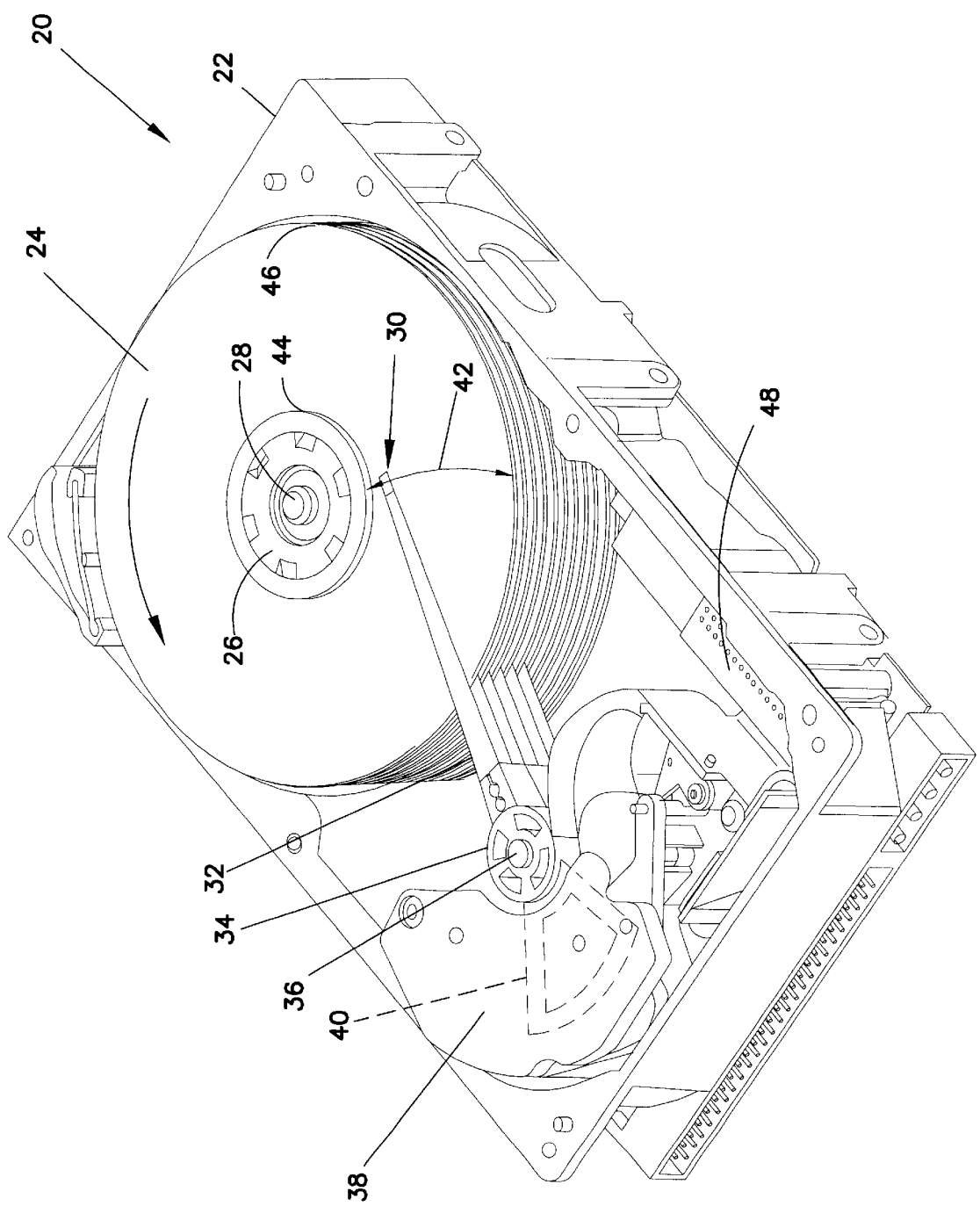
FIG. 1 is a perspective view of an embodiment of a magnetic disc drive in which the present invention can be used.

FIG. 1 is a perspective view of a magnetic disc drive 20 in which the present invention is useful. Disc drive 20 includes a housing with a base 22 and a top cover (not shown). disc drive 20 further includes a disc pack 24, which is mounted on a spindle motor (not shown) by a disc clamp 26. Disc pack 24 includes a plurality of individual discs, which are mounted for co-rotation about central axis 28. Each disc surface has an associated read/write head 30, which is part of a head assembly 32 mounted to disc drive 20 for communication with the disc surfaces. Head assembly 32 is mounted to a bearing 34 which rotates or pivots on an axle shaft 36 which is mounted to the base 22. A voice coil motor (VCM), shown generally at 38 actuates a voice coil 40 that is integral with the bearing 34. Voice coil motor 38 rotates bearing 34 with its attached head assembly 32 about the axle shaft 36 to position read/write head 30 over a desired data track along an arcuate path 42 between a disc inner diameter 44 and a disc outer diameter 46. Voice coil motor 38 operates under control of internal circuitry 48.

The read/write heads 30 and rotating disc pack 24 form a communication channel which can receive digital data, store the digital data, and reproduce the digital data at a later time. Write circuitry within internal circuitry 48 receives data, typically from a digital computer, and then a write transducer in read/write head 30 writes the data in an encoded form in a magnetic layer on the disc pack 24. At a later time, a read transducer in the read/write head 30 recovers the encoded data from the magnetic layer as a serial modulated read signal. Read circuitry within internal circuitry 48 decodes the read signal to reproduce the stored data for use in the digital computer.

Figure 3A:
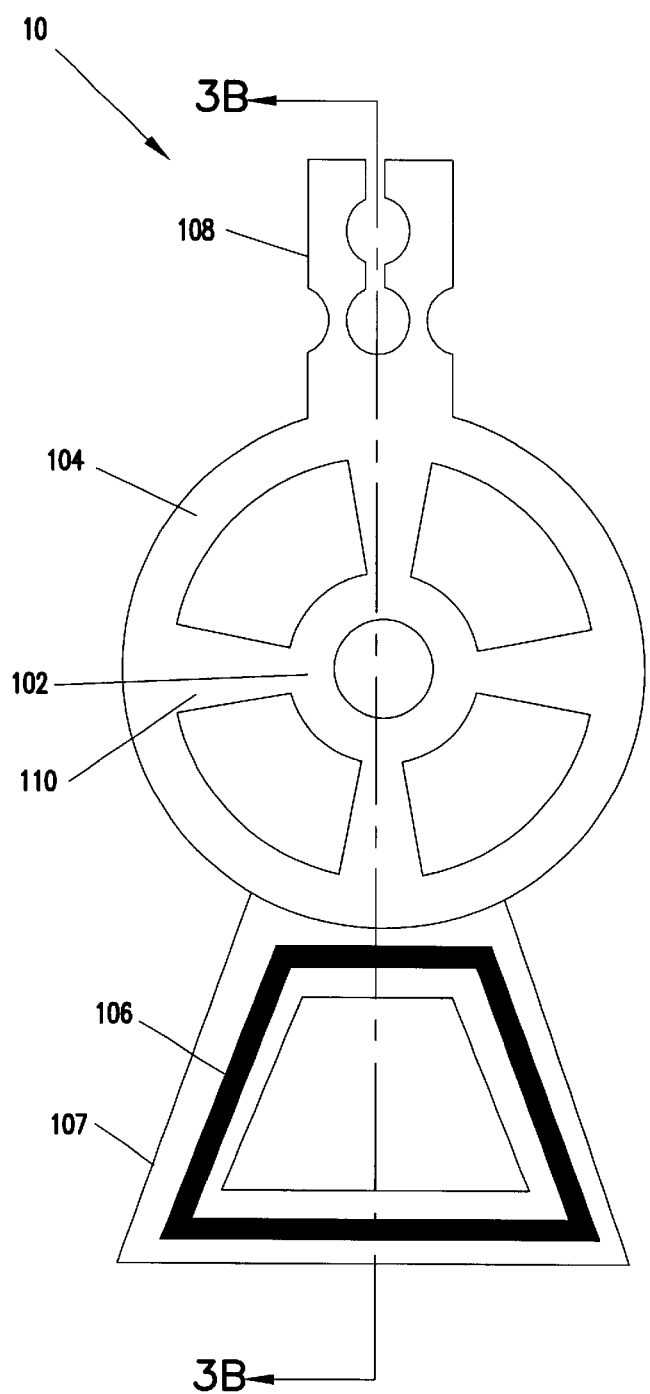
FIGS. 3A, 3B are front and side sectional view of the bearing shown in FIG. 2.
Figure 3B:
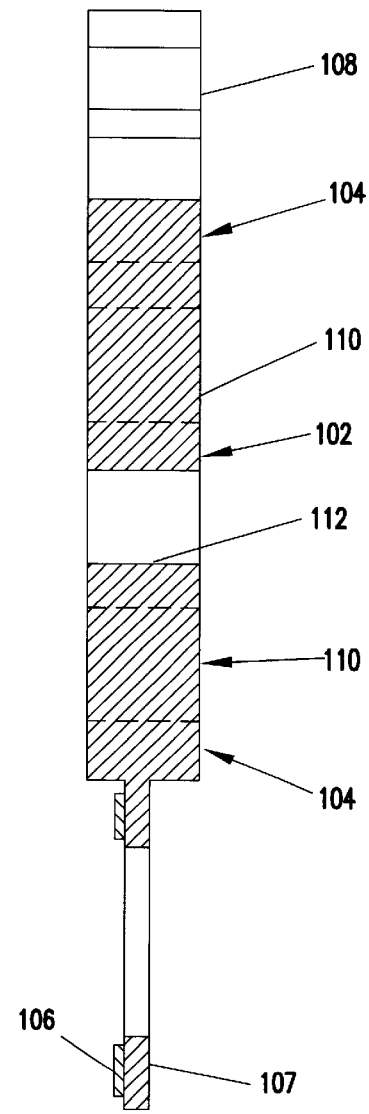

In FIGS. 2–3, The bearing 34 of FIG. 1 is shown in more detail at 10. The bearing 10 has an inner hub 102 that is arranged for rotational mounting on an axle shaft such as axle shaft 36 shown in FIG. 1. The bearing 10 also has an outer hub 104. A voice coil 106 and a tab 108 for mounting a head assembly to the bearing 10 are integrally formed on the periphery of the outer hub 104. Voice coil 106 is supported on a plate 107. The outer hub 104 is rotationally mounted to the inner hub 102 through a plurality of flexible spokes 110 that are integrally formed with the inner hub 102 and the outer hub 104. The outer hub 104 transfers torque from the voice coil 106 to the tab 108 for controlling the position of a read/write head mounted on the tab 108. The flexible spokes 110 are tapered in a radial direction. The inner portion of each flexible spoke 110 is narrower than the outer portion. The narrower inner portion is flexible and allows the outer hub 104 to rotate relative to the inner hub. As shown in a section view in FIG. 3B, the inner hub 102, the outer hub 104, the spokes 10, the plate 107 and the tab 108 are integrally formed together as a single block of material without any seams or joints. The inner hub 102 has a sleeve bearing surface 112 which is arranged to contact an axle shaft, such as axle shaft 36 of FIG. 1, for rotational or pivotal mounting of the bearing 10.

When static friction (stiction) stops or delays the rotation of inner hub 102 on an axle shaft, the flexible spokes 110 bend to allow the outer hub 104 to rotate before the inner hub 102 can rotate, reducing the delay time in changing the position of the voice coil and the read/write head. The voice coil can move the read/write head before the inner hub breaks free of stiction with the axle. The reduced delay time is very predictable when the bearing 10 is fabricated from a single block of substrate material using microelectromechanical system (MEMS) techniques. The uniform, integral component can be precisely etched to avoid out of plane motion. The electronic control of the voice coil motor can be tuned for tighter control to take advantage of the reduced delay time because the delay is so predictable using MEMS technology.

Figure 4:
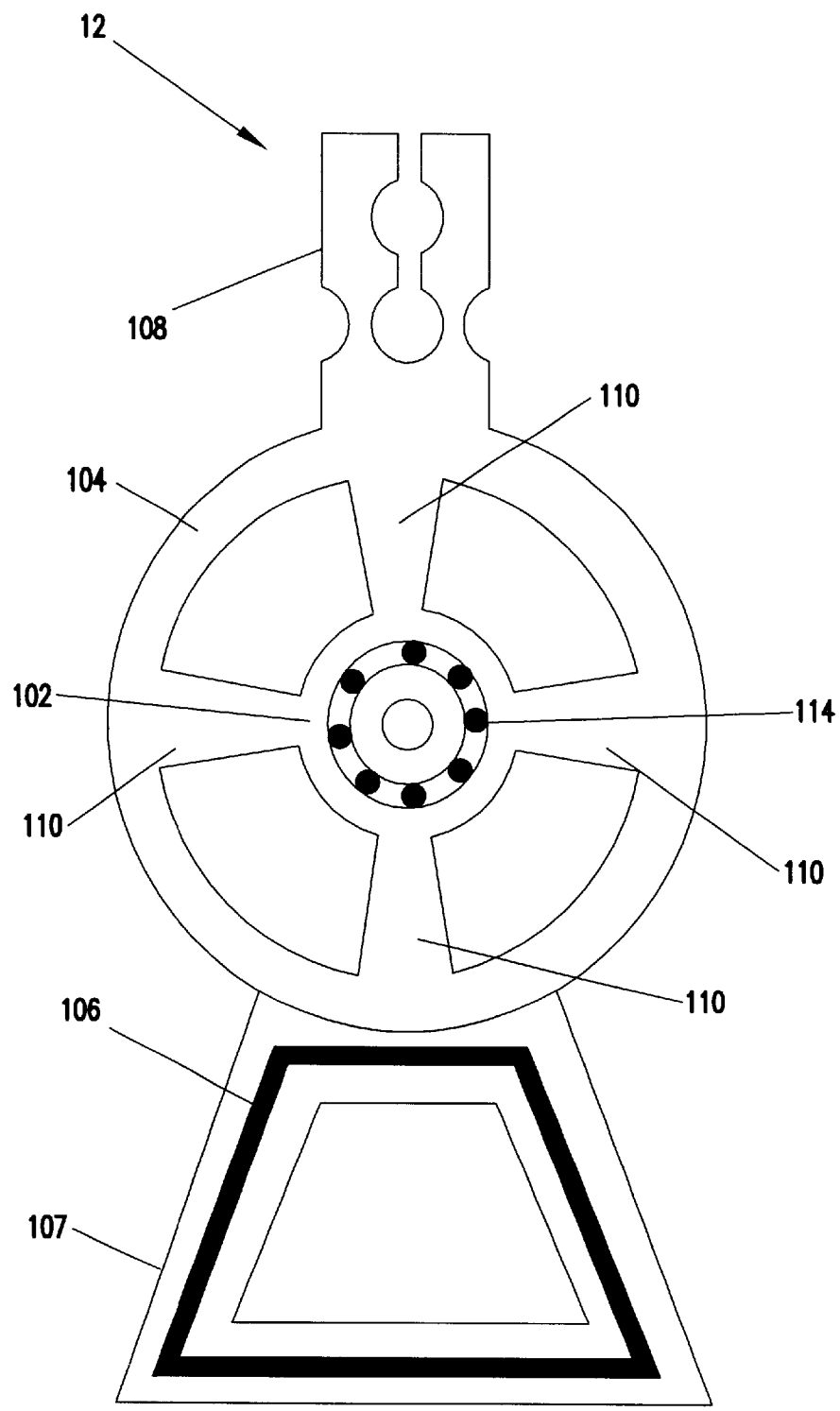
FIG. 4 is a front view of an embodiment of a bearing including a ball bearing.

In FIG. 4, an alternative embodiment 12 of bearing 10 is shown. Reference numerals in FIG. 4 that are the same as reference numerals used in FIGS. 2–3 identify similar or identical parts. In FIG. 4, instead of a sleeve bearing surface in the inner hub 102, a ball bearing 114 is provided. The inner hub 102 surrounds a ball bearing 114 that can be mounted an axle shaft. The use of a ball bearing provides reduced stiction and allows somewhat stiffer spokes 110 to be used.

Figure 5:
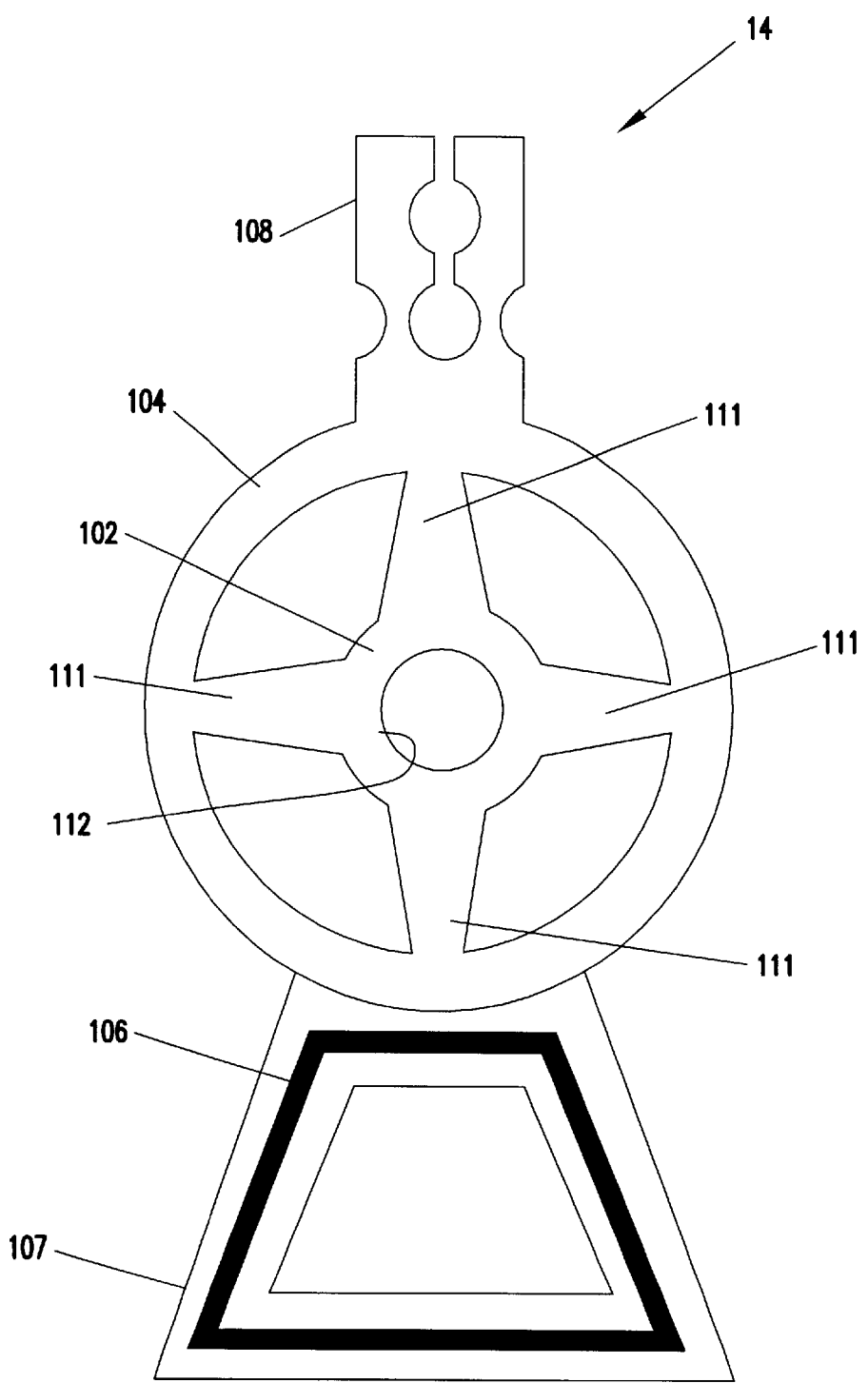
FIG. 5 is a front view of an embodiment of a bearing with radially tapering spokes that are wider in the center and narrower at the periphery of the bearing.

In FIG. 5, an alternative embodiment 14 of bearing 10 is shown. Reference numerals in FIG. 5 that are the same as reference numerals used in FIGS. 2–3 identify similar or identical parts. In FIG. 5, instead of the flexible spokes tapering to a narrow region near the inner hub, the flexible spokes 111 taper such that the narrower region of each spoke is close to the outer hub, and the thicker region is closer to the inner hub. The arrangement in FIG. 5 allows the outer hub 104 to rotate when stiction limits rotation of the inner hub 102 without rotating the entire mass of the spokes 111. This arrangement reduces the effective rotational inertia at the outer hub 104 when the inner hub 102 is stopped due to stiction.

Figure 6A:
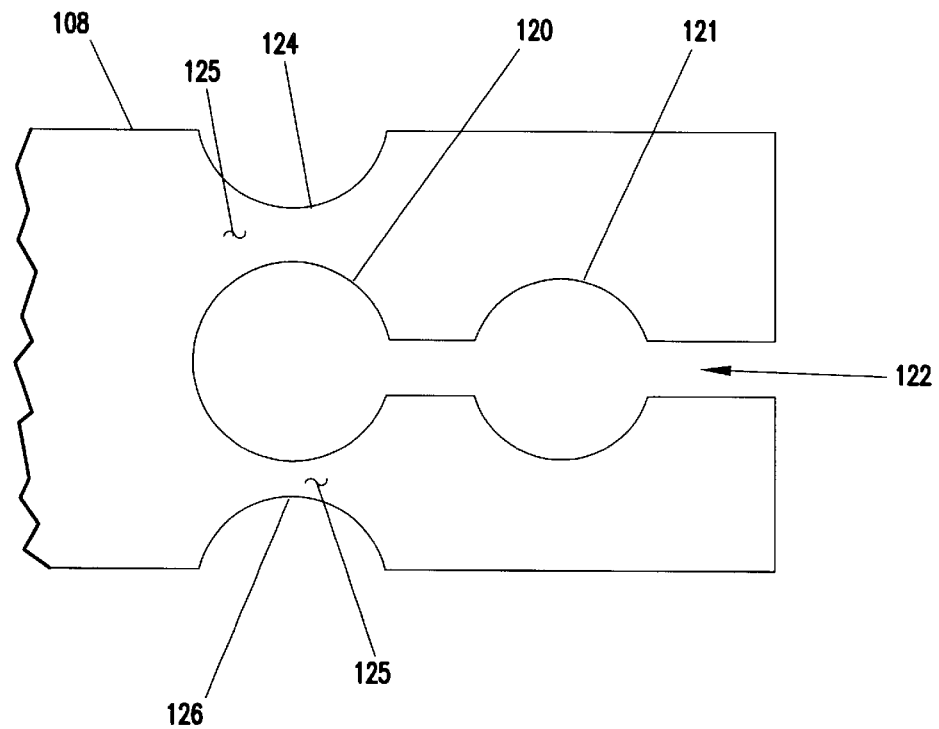
FIGS. 6A, 6B are enlarged front views of a mounting tab for attaching a read write assembly to a bearing.
Figure 6B:
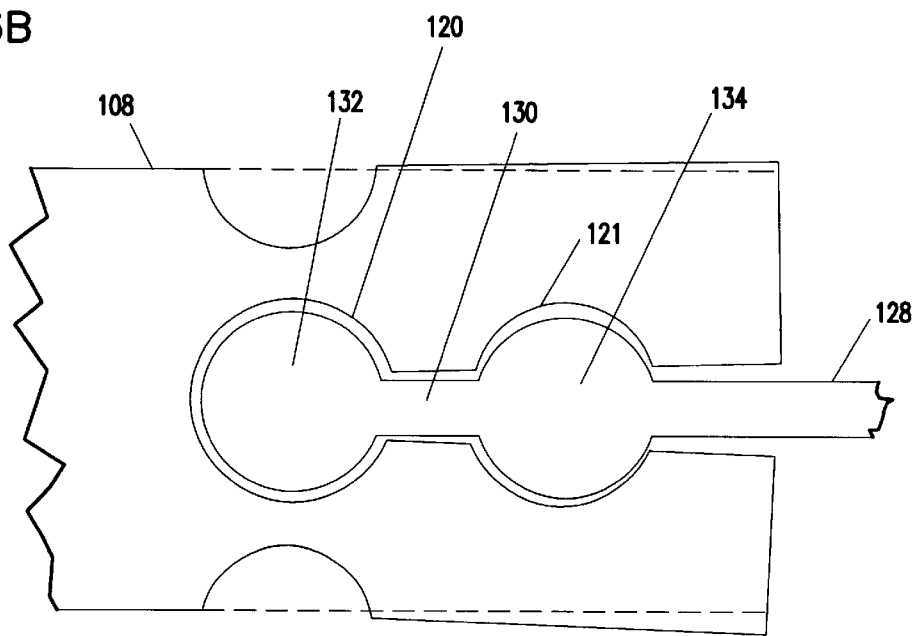

In FIGS. 6A and 6B, the mounting tab 108 is shown in more detail. Mounting tab 108 is formed integrally with the outer hub 104. Mounting tab 108 includes two bores 120, 121 and a slot 122. Mounting tab 108 is also provided with two notches 124, 126 adjacent bore 120. The notches 124, 126 provide thin regions 125 around bore 120 that are flexible. Mounting tab 108 is arranged to receive a head assembly 128. The head assembly includes a plate 130 which has two cylindrical protrusions 132, 134 along its length. The cylindrical protrusions 132, 134 engage the bores 120, 121. The diameter of the cylindrical protrusions 132, 134 are slightly larger than the diameters of the bores 120, 121. When protrusions 132, 134 are pressed along the cylindrical axes into the bores 120, 121, mounting tab 108 flexes slightly to accommodate the interference fit. This interference fit avoids lost motion or slack and provides a tight, secure engagement for the head assembly 128 on the tab 108.

Figure 7:
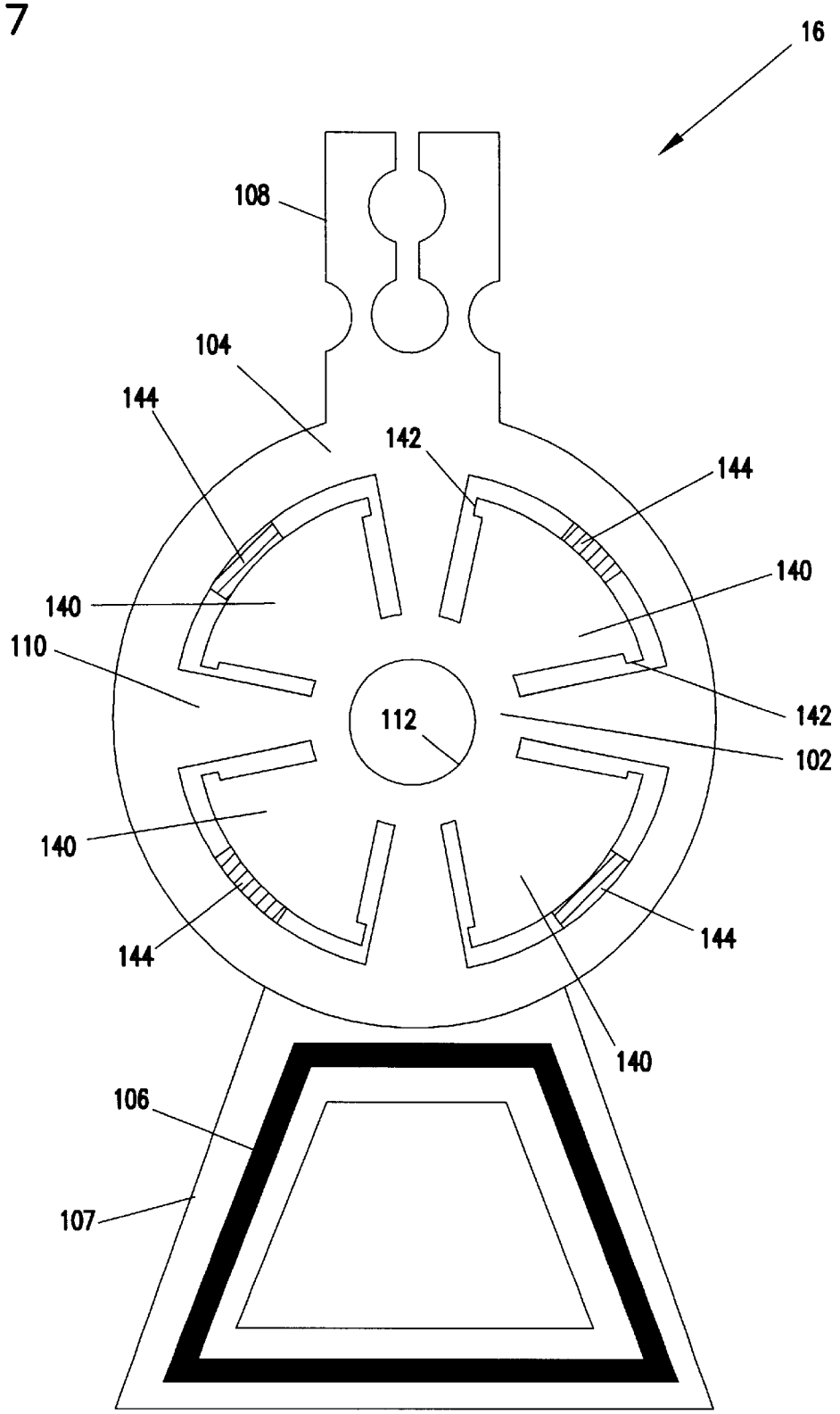
FIG. 7 is a front view of a bearing that includes sectors that limit flexing of flexible spokes and damping material.

In FIG. 7, an alternative embodiment 16 of bearing 10 is shown. Reference numerals in FIG. 7 that are the same as reference numerals used in FIGS. 2–3 identify similar or identical parts. In FIG. 7, sectors 140 are arranged integral with the inner hub 102. The edges 142 of sectors 140 are arranged close to the flexible spokes 110 to limit the range of flexure of flexible spokes 110. This limiting avoids cracking of the flexible spokes 110 under conditions of high shock or vibration, typical for portable equipment. If desired, damping material 144 can be injected between sectors 140 and outer rim 104 to damp oscillations when spokes 110 are flexed. Damping material 144 can be a cure in place silicone rubber or plastic resin. Damping material 144 helps ensure fast settling times without overshoot after bearing stiction breaks free.

Figure 8:
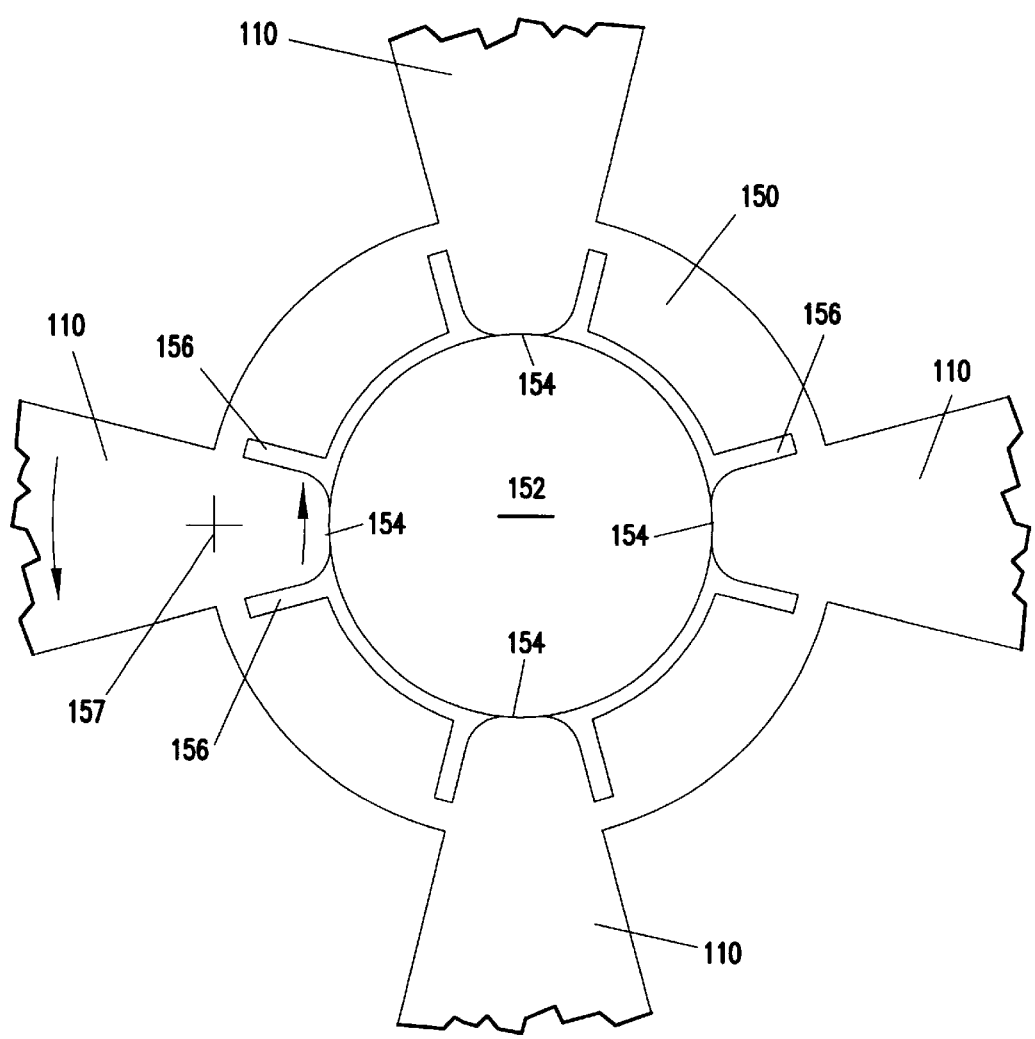
FIG. 8 is a front view of an embodiment of an inner hub of a bearing with a sleeve bearing surface that can be actuated by flexing of spokes.

In FIG. 8, an alternate arrangement of a sleeve bearing and axle shaft is shown. Reference numerals in FIG. 8 that are the same as reference numerals used in FIGS. 2–3 identify similar or identical parts. In FIG. 8 an inner hub 150 is mounted on an axle 152. The inner hub 150 includes modified sleeve bearing surfaces 154 that contacts the axle 152. The sleeve bearing surfaces are arranged at the ends of the flexible spokes 110. The ends of the flexible spokes 110 are flexibly mounted in the inner hub 150. Grooves 156 in inner hub 110 increase the flexibility of the mounting. When flexible spokes 110 flex, motion is transmitted to the sleeve bearing surfaces. The transmitted motion actuates sleeve bearing surfaces 154 relative to the axle 152, tending to reduce stiction. The flexible or pivotal mounting of the spokes to the inner hub provides a large mechanical advantage and a large force at the stiction surface when the spoke is actuated at the outer hub. The spokes pivot around axes 157.

The bearing shown in FIGS. 1–8 are preferable shaped by chemical etching using photolithography, masking and etching techniques derived from silicon batch fabrication techniques. The voice coil is preferably deposited using photolithographic methods as well. The finished bearing, with its voice coil deposited on it, forms a microelectromechanical system (MFMS) component.

Figure 9:
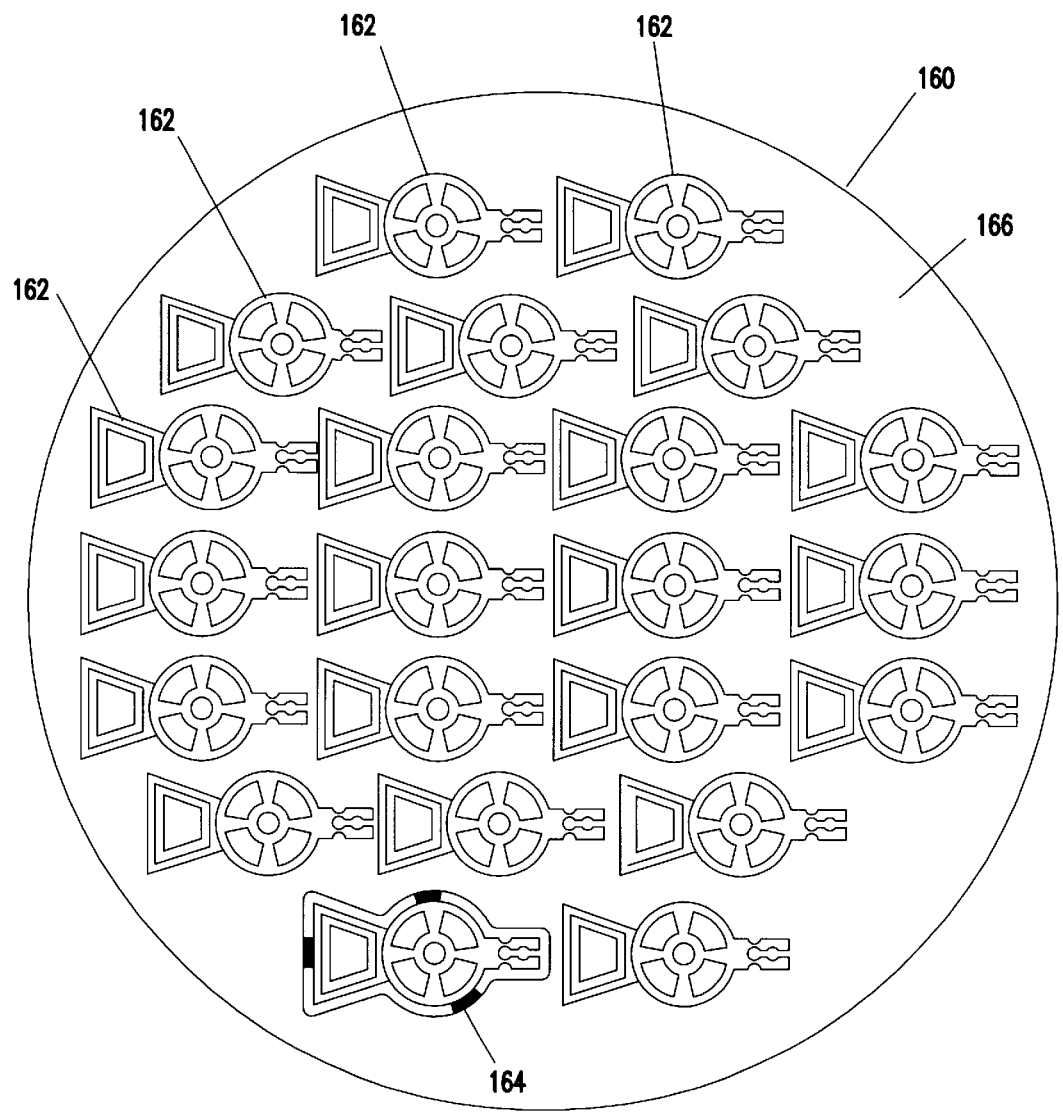
FIG. 9 is a front view of an embodiment of a wafer with bearings etched therein.

In FIG. 9, the bearing is preferably formed from a wafer 160 of suitable material such as silicon, or a ceramic material such as silicon carbide (SiC). In the case of silicon, a thin layer such as silicon dioxide, silicon nitride or other know insulators can be grown or deposited on surfaces of the bearing to electrically isolate the voice coil and interconnections from the silicon, if desired. The voice coil can be deposited using photolithographic techniques and can be formed of aluminum, gold or other suitably conductive metals.

Using photolithography techniques known from the semiconductor industry, the wafer 160 can be etched to shape a plurality of bearings 162 in a batch fabrication process. Deep reactive ion etching (DRIE) is preferred over a LIGA process to etch or form uniform complex geometries. Photolithography masks are assembled using step and repeat techniques to place the pattern for multiple bearing on a single mask. Using multiple masks and masking one or both sides of the sheet of material, grooves and slots can be etched to the desired depths. Masks are also used to selectively plate or deposit electrical conductors to form the voice coil on the plate and the interconnecting leads on the outer hub. The individual bearings are retained after etching is completed by an integral thin web 164 retaining the MEMS bearing in the remaining etchable substrate matrix 166 formed around the bearings.

The deposition of electrical conductors is done as a batch process while the bearings are still connected together by the web 164. After all batch processes are complete, the integral thin web is cut or broken away and the individual bearings are removed from the surrounding substrate 160.

The finished bearing 10, 12, 14 or 16 is assembled into a disc drive 20 in a conventional manner as shown in FIG. 1. A flexible ribbon cable between the outer bearing surface and circuitry on the disc drive base provides connections for the voice coil and the read/write heads. The disc drive includes a disc stack 24 which serves as a means for storing information. The disc stack is rotationally driven by a spindle motor around a first axis of rotation. The spindle motor is mounted to a base 22 of the disc drive. The disc drive 20 includes a read/write head 30 that serves as a means for accessing the information stored on the disc stack 24. The read/write head 30 is pivotable about a second axis, spaced apart from the first axis, to move to different parts of the disc stack 24 to access information. The disc drive 20 includes a voice coil 40 which serves as a means for pivoting the voice coil around the second axis.

The bearing serves as a means for supporting the means for accessing and the means for pivoting. The bearing includes an inner hub rotationally mounted around the second axis, and an outer hub having the voice coil and the means for accessing mounted on it. The bearing includes spokes that serve as means for flexing integrally mounted between the outer hub and the inner hub, the means for flexing allowing the outer hub to rotate relative to the inner hub.

In FIGS. 10A–E, various embodiments of the voice coil are illustrated in more detail. In FIG. 10A, a front view of a voice coil 170 is shown disposed on a plate 171. Voice coil 170 includes a conductive path that runs along a first spiral 172 and follows a clockwise spiral path multiple times around opening 174 until it reaches a via 176. Via 176 provides a connection to a second spiral 178, shown in dashed lines. Second spiral 178 is embedded in a different layer than spiral 172, and is electrically insulated from spiral 172. Second spiral 178 also forms part of the voice coil 170 and also follows a clockwise spiral path, that runs to a connection at 180.

In an embodiment 182 of a voice coil shown in FIG. 10B, the voice coil comprises a first layer 184 with a first spiral conductor 185, a second layer 186 of electrically insulating material, and a third layer 188 with a second spiral conductor 190. The first spiral conductor 185 and the second spiral conductor 190 are connected at a via 192. The first layer 184, the second layer 186 and the third layer 188 can be successively deposited on plate 171 or, alternatively, these layers can be preformed as a printed circuit and then deposited together on plate 171. In embodiment 182, the layers 184, 186 and 188 are all on the same side of plate 171.

In an embodiment 200 of a voice coil shown in FIG. 10C, the voice coil comprises a first layer 202 with a first spiral conductor 204, and a second layer 206 with a second spiral conductor 208. A conductive via 210 passes through plate 171 to complete a connection between the first spiral conductor 204 and the second spiral conductor 208. In embodiment 200, the spiral conductors 204, 208 are deposited on both sides of plate 171.

In an embodiment 220 of a voice coil shown in FIG. 10D, the voice coil spiral is shown generally at 222 on plate 171. Cavities 175 in both radial arms 177 of plate 171 are filled with a deposits 224 of magnetic material, for example ferrite. The deposits 224 of ferrite underlie the corresponding radial arms of the voice coil spiral or spirals. The magnetic material effectively decreases the air gap for the radial arms in the voice coil motor and improves voice coil motor performance.

In an embodiment 230 of a voice coil shown in FIG. 10E, the voice coil spiral is shown generally at 232 on plate 171. A layer 234 of magnetic material, for example ferrite, is deposited on radial arms 177 underlying corresponding radial arms of the voice coil spiral or spirals. The layer 234 of magnetic material effectively decreases the air gap for the radial arms of the voice coil motor and improves voice coil motor performance.

In the voice coil embodiments 220, 230, the magnetic material 224 or 234 is preferably placed on the radial arms 177 in regions, or portions of regions, where there are overlying voice coil spirals, and not placed in regions where there are no voice coil spirals. The central opening 174 preferably remains open. The magnetic materials 224 or 234 can also be used with either of the voice coil embodiments 182, 200.

Various aspects of the voice coil embodiments shown at 182, 200, 220 and 230 can be combined with each other as needed for a particular application. When ceramic is used to form the substrate wafer and magnetic materials are used, the substrate and a magnetic ceramic, such as ferrite, can be sintered together to form a single integral wafer. Alternatively, magnetic materials can be deposited in later process steps after etching.

Figure 11A:
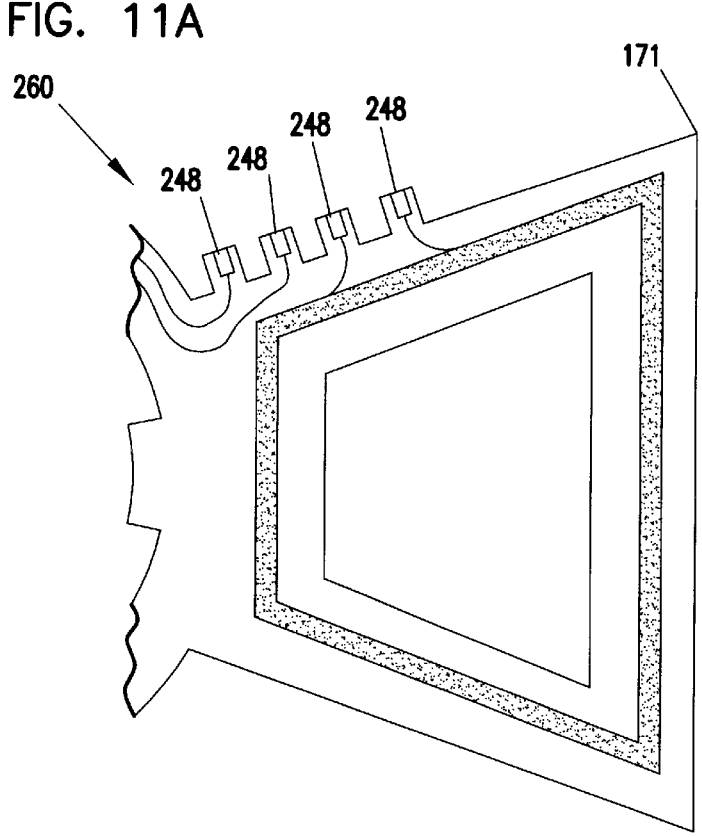
FIGS. 11A–C are illustrations of embodiments of connector tabs.
Figure 11C:
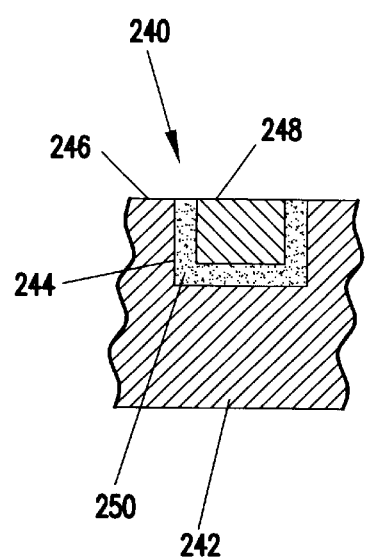
Figure 11B:
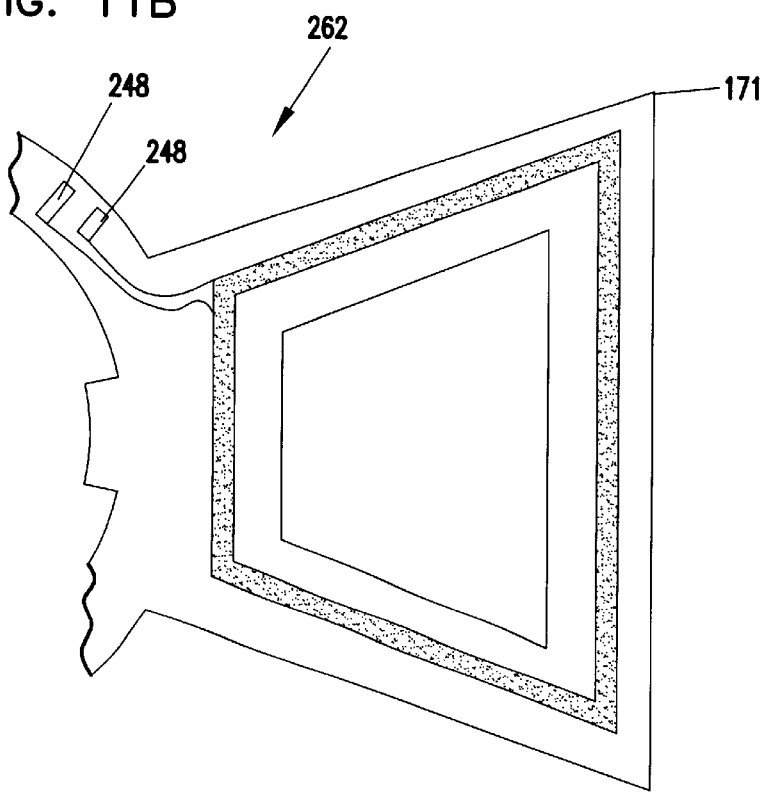

In FIGS. 11A, B, C, details of embodiments of connector tabs for circuits such as the voice coil and the head are illustrated. A greatly enlarged cross section of a connector tab is shown in FIG. 11C at 240. The substrate material 242 has a groove or notch 244 etched into its top surface 246. A connector tab 248, formed of a conductive material such as metal, is deposited into the notch 244. When the substrate 242 is a semiconductor material such as silicon, then an insulating material 250 is deposited in notch 244 before the connector tab 248 is deposited. The insulating material can be silicon oxide, silicon nitride, or other known electrically insulating materials. During assembly of the disc drive, wires are bonded to the connector tabs to connect the voice coil, the head, or both to other circuits in the disc drive. Connector tabs 248 can be on the side of the bearing as shown at 260 in FIG. 11A. Alternatively connector tabs 248 can be on a face surface of the bearing as shown at 262 in FIG. 11B. The location of the connector tabs is selected to be any side or top location that is convenient for connections.

Figure 12A:
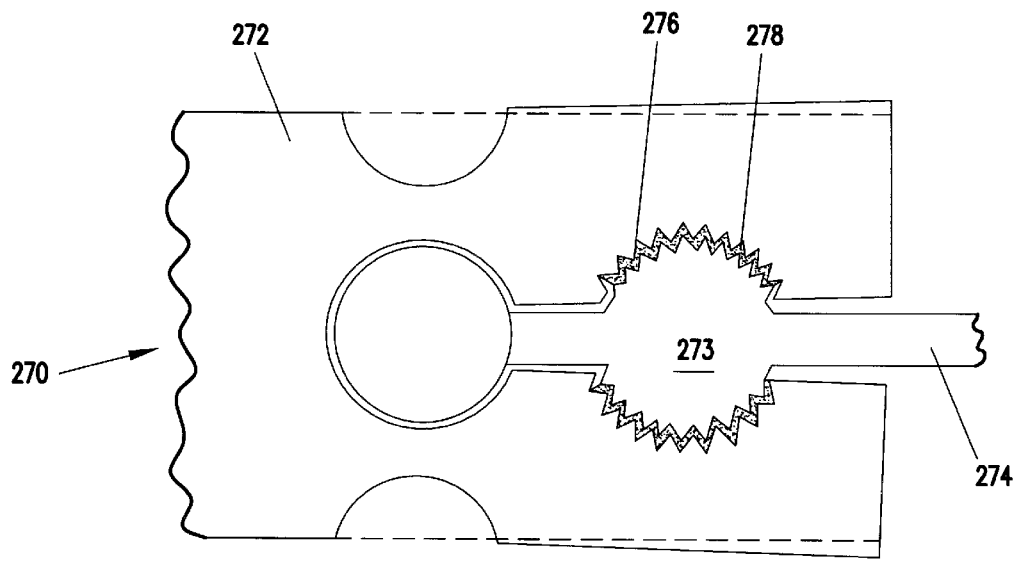
FIGS. 12A, 12B are illustrations of embodiments of mounting tabs.

FIGS. 12A, B illustrates further embodiments of mounting tabs. In the embodiment shown at 270 in FIG. 12A, a mounting tab 272 is joined with a head assembly 274. A bore 276 in the mounting tab 272 has a serrated inner surface. A protrusion 273 of the head assembly 274 has a serrated outer surface. The serrations of protrusion 278 match the serrations on the inner surface of mounting tab 272. Either the bore 272 or the protrusion 273 are coated with a soft metal 278. When the head assembly 274 is pressed onto the mounting tab 272, the soft metal 278 deforms or swages. As a result of the deformation of the soft metal, the joint between the head assembly 274 and the mounting tab 272 is secure. The soft metal can be a soft solder alloy or babbit material.

Figure 12B:
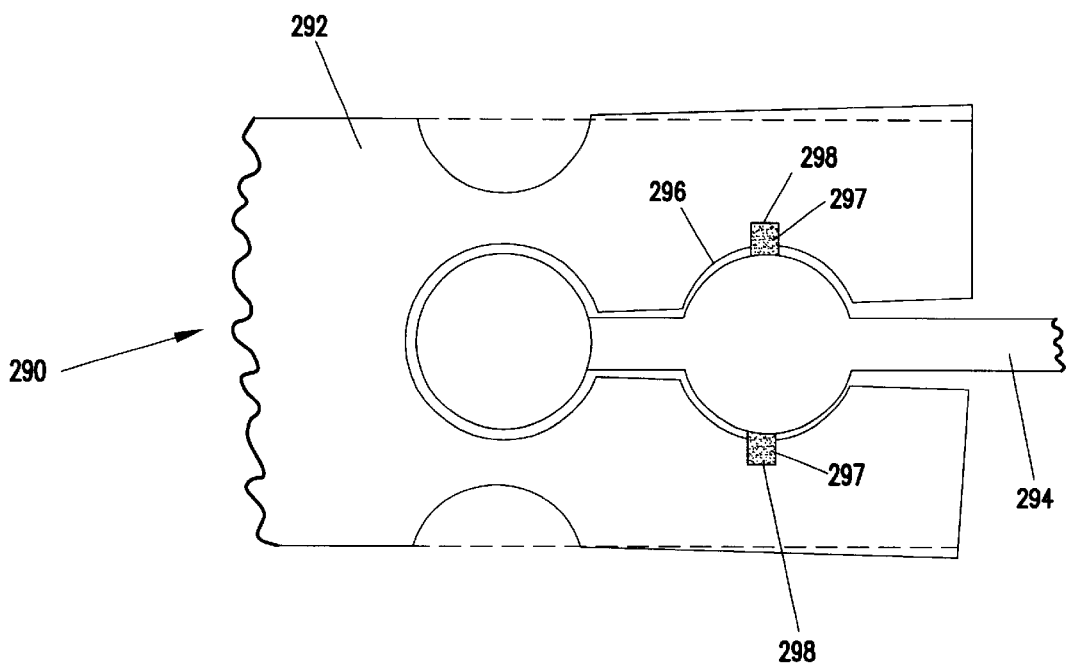

In the embodiment shown at 290 in FIG. 12B, a mounting tab 292 is joined to a head assembly 294. Mounting tab 292 has a bore 296. Bore 296 includes notches 298 Notches 298 are filled with a deposit of soft metal 297 that protrudes slightly into bore 296. When the head assembly 294 is pressed onto the mounting tab 292, the soft metal deforms or swages. The deformed soft metal forms secure connection between the head assembly 294 and the mounting tab 292.

The completed disc drive (20) comprises a base (22), an axle shaft (36), a disc stack (24), a head assembly (32) coupled to the disc stack, a voice coil (38); and a bearing (34). The bearing (34) has an inner hub (102) rotationally mounted on the axle shaft (36), and an outer hub (104) having the voice coil (106) and the head assembly (32) mounted thereon. The outer hub (104) is rotationally mounted to the inner hub (102) through a plurality of flexible spokes (110) that are integrally formed with the inner and outer hubs (102, 104).

Although the present invention has been described with reference to preferred embodiments, workers skilled in the art will recognize that changes may be made in form and detail without departing from the spirit and scope of the invention. Spokes, for example, can be formed in fewer or greater numbers. The shape of the spokes can be varies as needed to provide the desired mechanical properties for the bearing. Various shapes of the mounting tab can be used to match the mounting needed for the head assembly. Any detail shown in one embodiment can be adapted for use in another embodiment.

What is claimed is:

1. A disc drive, comprising:
   a disc stack rotationally mounted to an axle shaft on a base;
   a head assembly coupled to the disc stack;
   a voice coil; and
   a seamless bearing having an inner hub rotationally mounted on the axle shaft, and an outer hub having the voice coil and the head assembly mounted thereon, the outer hub being rotationally mounted to the inner hub through a plurality of flexible spokes having inner spoke ends extending from the inner hub and outer spoke ends extending from the outer hub.

2. The disc drive of claim 1 wherein the flexible spoke have a radial taper.

3. The disc drive of claim 1 wherein the bearing comprises a mounting tab seamlessly extending from the outer hub, the mounting tab having a flexible tip engaging the head assembly.

4. The disc drive of claim 1 wherein the inner hub includes a sleeve bearing surface contacting the axle shaft.

5. The disc drive of claim 4 wherein a portion of the sleeve bearing surface is actuated relative to the axle shaft by the flexing of the flexible spokes.

6. The disc drive of claim 1 wherein the bearing and the voice coil are formed as a microelectromechanical system (MEMS) component.

7. The disc drive of claim 1 wherein the bearing is formed of ceramic.

8. The disc drive of claim 1 wherein the inner hub surrounds a ball bearing mounted on the axle shaft.

9. The disc drive of claim 1 wherein the bearing is shaped by etching.

10. The disc drive of claim 1 wherein the bearing is batch fabricated from silicon.

11. A microelectromechanical system (MEMS), comprising:
   a voice coil;
   a seamless bearing having an inner hub adapted for rotational mounting on an axle shaft, and having an outer hub having the voice coil integrally mounted thereon, the outer hub being rotationally mounted to the inner hub through a plurality of flexible spokes having inner spoke ends extending from the inner hub and outer spoke ends extending from the outer hub; and
   a mounting tab extending seamlessly from the outer hub, the mounting tab having a tip adapted for engaging a head assembly of a data storage device.

12. The microelectromechanical system (MEMS) of claim 11 wherein the flexible spokes have a radial taper.

13. The microelectromechanical system (MEMS) of claim 11 wherein the inner hub includes a sleeve bearing surface contacting the axle shaft.

14. The microelectromechanical system (MEMS) of claim 13 wherein a portion of the sleeve bearing surface is actuated relative to the axle shaft by the flexing of the flexible spokes.

15. The microelectromechanical system (MEMS) of claim 11 wherein the inner hub surrounds a ball bearing mounted on the axle shaft.

16. A disc drive, comprising:
   a disk stack rotationally mounted on a first axis of rotation;
   a head assembly pivotable about a second axis of rotation spaced apart from the first axis of rotation, the head assembly including a read/write head;
   a voice coil pivoting the head assembly;
   a seamless bearing supporting the head assembly and the voice coil, the bearing including an inner hub rotationally mounted around the second axis, and an outer hub having the voice coil and the head assembly mounted thereon; and
   means for flexing formed between the outer hub and the inner hub, the means for flexing allowing the outer hub to rotate relative to the inner hub, and the means for flexing having inner ends extending seamlessly from the inner hub and outer ends extending seamlessly from the outer hub.

17. A MEMS bearing, comprising:
   an inner hub adapted for rotational mounting on an axle shaft;
   an outer hub rotationally mounted to the inner hub through a plurality of flexible spokes having inner spoke ends extending seamlessly from the inner hub and outer spoke ends extending seamlessly from the outer hub; and
   a plate seamlessly extending from the outer hub, the plate having a surface adapted to receive a voice coil.

18. A disc drive, comprising:
   a disc stack rotationally mounted to a base;
   a head assembly coupled to the disc stack, the head assembly including a support plate with a cylindrical protrusion;
   a voice coil; and
   a seamless bearing having a rotationally mounted inner hub, and an outer hub having the voice coil mounted thereon, the outer hub being rotationally mounted to the inner hub through a plurality of flexible spokes having inner spoke ends extending from the inner hub and outer spoke ends extending from the outer hub, the bearing further including a flexible tip seamlessly extending from the outer hub, the flexible tip having a bore engaging the cylindrical protrusion.

* * * * *

UNITED STATES PATENT AND TRADEMARK OFFICE
CERTIFICATE OF CORRECTION

PATENT NO. : 6,636,386 B1 Page 1 of 1
APPLICATION NO. : 09/470032
DATED : October 21, 2003
INVENTOR(S) : Zine-Eddine Boutaghou It is certified that error appears in the above-identified patent and that said Letters Patent is hereby corrected as shown below:

Column 7
Line 43, delete "Spoke" and insert --spokes--

Signed and Sealed this

Sixteenth Day of March, 2010

David J. Kappos
*Director of the United States Patent and Trademark Office*